United States Patent [19]

Rudolf et al.

[11] 4,296,149

[45] Oct. 20, 1981

[54] MANUFACTURE OF ACICULAR COBALT-CONTAINING MAGNETIC IRON OXIDE

[75] Inventors: Peter Rudolf, Neuhofen; Werner Steck, Mutterstadt; Helmut Jakusch, Frankenthal; Guenter Vaeth, Limburgerhof; Christof Jaeckh, Heidelberg, all of Fed. Rep. of Germany

[73] Assignee: BASF Aktiengesellschaft, Fed. Rep. of Germany

[21] Appl. No.: 116,552

[22] Filed: Jan. 29, 1980

[30] Foreign Application Priority Data

Feb. 13, 1979 [DE] Fed. Rep. of Germany ....... 2905351

[51] Int. Cl.³ ............................................. C01G 49/06
[52] U.S. Cl. ................................. 427/130; 252/62.56; 427/127
[58] Field of Search ..................... 252/62.56; 427/127, 427/128, 130, 131

[56] References Cited

U.S. PATENT DOCUMENTS 3,081,264 3/1963 Nobuoka et al. .
3,573,980 4/1971 Haller et al. .
4,188,302 2/1980 Becker et al. ................... 252/62.56

FOREIGN PATENT DOCUMENTS

| 2100390 | 9/1971 | Fed. Rep. of Germany . |
| 2811473 | 9/1978 | Fed. Rep. of Germany . |
| 1268458 | 3/1972 | United Kingdom . |
| 1318579 | 5/1973 | United Kingdom . |
| 1432643 | 4/1976 | United Kingdom . |
| 1441183 | 6/1976 | United Kingdom . |

OTHER PUBLICATIONS

Kishimoto et al. "J. Appl. Phys." 50(1), 1979 pp. 450-452.

*Primary Examiner*—Jack Cooper
*Attorney, Agent, or Firm*—Keil & Witherspoon

[57] ABSTRACT

A process for the manufacture of acicular magnetic iron oxide consisting of a core of gamma-iron(III) oxide and a ferrite shell which contains, based on the total amount of magnetic material, from 0.2 to 12 percent by weight of cobalt(II) ions and from 0.1 to 15 percent by weight of iron(II) ions, wherein a solution containing cobalt(II) hydroxide and iron(II) hydroxide is applied to acicular gamma-iron(III) oxide particles and the latter are heated at 100°–220° C.

1 Claim, No Drawings

MANUFACTURE OF ACICULAR COBALT-CONTAINING MAGNETIC IRON OXIDE

The present invention relates to a process for the manufacture of acicular, magnetic iron oxide consisting of a core of gamma-iron(III) oxide and a shell containing, based on the total amount of magnetic material, from 0.2 to 12 percent by weight of cobalt(II) ions and from 0.1 to 15 percent by weight of iron(II) ions.

Acicular gamma-iron(III) oxide has been employed for a long time and on a large scale as a magnetizable material in the manufacture of magnetic recording media. However, as a result of continued development in the field of recording technology, there is an increasing need for magnetic materials which in particular have a higher coercive force than gamma-iron(III)oxide. It is true that the coercive force of iron oxides can, under certain circumstances, be substantially increased by modification with cobalt, but such modified materials show a number of undesirable properties, in particular the residual induction and coercive force thereof are unstable to thermal and mechanical factors. Materials having these disadvantages are unsuitable for use in magnetic recording media.

Cobalt-containing acicular iron oxides are obtainable by a number of processes. According to German Pat. Nos. 1,112,725 and 1,226,997, cobalt modification can easily be achieved by co-precipitation of iron hydroxide and cobalt hydroxide during the manufacture of goethite, since the subsequent conversion of the cobalt-containing goethite to the corresponding gamma-iron(III) oxide is carried out in the conventional manner. German Laid-Open Application DOS 2,100,390 also proposes a similar procedure.

According to German Published Application DAS 2,036,612, a cobalt compound can also be precipitated onto the surface of a gamma-iron(III) oxide. The cobalt is incorporated into the iron oxide lattice by subsequent heating at 380°–400° C. A different procedure is disclosed in German Laid-Open Application DOS 2,243,231. Here, the acicular iron oxide hydroxide, before being reduced to magnetite, is provided with a protective coating to avoid sintering of the needles, and after application of the cobalt compound to the magnetite or to the gamma-iron oxide the product is heat-treated. A further method of obtaining cobalt-containing acicular iron oxide is described in German Laid-Open Application DOS 2,022,013. Here, acicular FeOOH or $Fe_2O_3$ is mixed with a liquid containing a cobalt compound, the slurry is dried and then, using conventional processes, the material is either converted to gamma-iron(III) oxide or, where gamma-iron(III) oxide was employed as starting material, is merely sintered. It is also known from German Published Application DAS 1,907,236 that cobalt-containing acicular gamma-iron(III) oxide can be prepared by suspending gamma-iron(III) oxide as such, or an oxide obtained as an intermediate in its manufacture, in an aqueous medium, precipitating a cobalt compound onto the oxide and then heating the product at a temperature high enough to decompose the cobalt compound. The partial reduction of the cobalt-modified gamma-iron(III) oxide obtained by the above process, in order to increase the coercive force, has also been proposed.

It has also already been attempted to increase the coercive force of iron oxides by coating acicular oxides with an epitaxial layer of cobalt ferrite (British Pat. No. 1,441,183). A similar procedure is described in German Laid-Open Application DOS 2,811,473. There, the cobalt ferrite layer is produced by simultaneously applying cobalt ions and ions to the iron oxide and carrying out a cautious oxidation.

The cobalt-containing acicular iron oxides produced by the prior art methods do not have entirely satisfactory magnetic properties and in most cases exhibit heat instability and/or mechanical instability. The desired high coercive force is only achieved by varying the relatively high content of cobalt, which then leads to the well-known disadvantages. Reducing the amount of cobalt and at the same time increasing the treatment temperature does not give products which, when used in magnetic recording media, meet the necessary requirements.

It is an object of the present invention to provide a simple process for the manufacture of a cobalt-containing acicular magnetic iron oxide which is suitable for use as a magnetizable material in magnetic recording media and which exhibits a very high coercive force, the temperature dependence of the magnetic properties being only slight, and a narrow field strength distribution.

We have found that this object is achieved and that an acicular magnetic iron oxide which has the desired properties and which consists of a core of gamma-iron(III) oxide surrounded by a ferrite shell containing, based on the amount of magnetic material, from 0.2 to 12 percent by weight of cobalt(II) ions and from 0.1 to 15 percent by weight of iron(II) ions can be manufactured if an acicular gamma-iron(III) oxide is suspended in water, the suspension is brought to a pH of not less than 10 by adding an aqueous base, an aqueous solution containing cobalt(II) ions and iron(II) ions is then added under an inert gas atmosphere at a temperature not exceeding 45° C., and after the cobalt(II) hydroxide and iron(II) hydroxide precipitate has formed, the solid product is filtered off, washed neutral with water and heated for from one to seven hours at from 100° to 200° C.

These acicular cobalt-containing magnetic iron oxides produced by the process according to the invention thus possess a core of the gamma-iron(III) oxide employed and an outer shell, surrounding this core, which consists predominantly of magnetite and cobalt(II) ions embedded therein in the form of cobalt ferrite.

Suitable starting materials for the process according to the invention are the acicular magnetic gamma-iron(III) oxides produced by conventional methods. These iron oxide particles have a mean length of from 0.2 to 1.5 μm and a length-to-width ratio of from 6:1 to 20:1. The particles are obtained by converting acicular iron (III) oxide hydroxide to magnetite in a reducing atmosphere and then oxidizing the magnetite to gamma-iron(III) oxide at below 400° C. Where appropriate, a heat treatment may be carried out before or after reduction in order to improve the mechanical and magnetic properties. It is also possible to treat the various iron oxide intermediates in the production of the gamma-iron (III) oxide with inorganic or organic substances, for example to retain the shape of the particles, and such a treatment may in special cases prove advantageous. A suitable gamma-iron(III) oxide can also be produced by coating an acicular non-magnetic iron oxide or iron oxide hydroxide with a higher hydrocarbon, higher alcohol, amine, fatty acid or fatty acid salt, and converting the oxide to gamma-iron(III) oxide at about 400°–650° C. in the presence of air.

The iron(II) and cobalt(II) compounds required for the process according to the invention must be selected so that they are non-oxidizing in aqueous alkaline solution and so that they form the corresponding hydroxides. Advantageously, the chlorides and sulfates of the metals are employed.

To carry out the process according to the invention, the gamma-iron(III) oxide is suspended in water, preferably in from 5 to 10 parts by weight of water, by vigorous stirring or by means of other conventional equipment. The aqueous solutions containing cobalt(II) ions and iron(II) ions and the aqueous bases can be added in any desired sequence. However, it has proved particularly advantageous first to introduce the solution, containing cobalt(II) ions, into the suspension and then to bring the pH of the suspension to not less than 10, preferably to not less than 12, by adding an aqueous base, especially sodium hydroxide. After having stirred the mixture for about one hour, the aqueous solution containing iron(II) ions is added. It is advisable to continue vigorous stirring for a prolonged period thereafter; from four to seven hours has proved advantageous and sufficient. The entire reaction, but especially from the addition of the iron(II) ions, is carried out under a blanket of inert gas. The reaction temperature should not exceed 45° C. and should preferably be from 5° to 45° C.; it has proved advantageous to carry out the process at room temperature.

After this precipitation of cobalt(II) hydroxide and iron (II) hydroxide has taken place in the gamma-iron-(III) oxide suspension, all the solids are filtered off and washed with water until the wash liquor is neutral. The filter cake is then heated for from one to seven, preferably from two to four, hours at from 100° to 200° C., for example in a rotary kiln. This both dries and heat-treats the product formed in the reaction described above; the treatment can be carried out in a stream of inert gas or in a stream of air. If drying and heating is carried out in a stream of inert gas, usually nitrogen, at, preferably, from 130° to 180° C., the period of heating is advantageously from two to four hours. If the filter cake is treated in an oxidizing atmosphere, i.e. in a stream of air, appropriate parameters are a temperature of from 110° to 150° C. and a heating period of from one to three hours. However, this process step can also be carried out by first drying the filter cake in a stream of air at from 100° to 120° C. and then heating it under an inert gas for from one to three hours at from 130° to 180° C.

The acicular cobalt-containing iron oxides which have been modified by the process according to the invention exhibit a number of improvements over prior art products. Thus, the magnetic materials produced by the novel process have a higher coercive force and a narrower field strength distribution. Accordingly, by using the method described, it is possible to combine the advantageous properties of gamma-iron(III) oxide with those of magnetite and of cobalt ferrite without having to accept the disadvantages of the last-mentioned compound, such as poor orientability, a broad field strength distribution, thermal instability of the magnetic properties, and high magnetostriction.

It is advantageous if the temperature dependence of the coercive force and of the residual induction of such cobalt-containing products is only slightly less good than that of pure gamma-iron(III) oxide. Only in this case do the improved magnetic properties of the cobalt-containing magnetic materials fully contribute toward improving the recording properties of magnetic recording media made from these materials.

In addition to the temperature dependence of the magnetic properties, the field strength distribution of the individual particles of such magnetic materials is an important criterion in selecting materials for the manufacture of magnetic recording media. The field strength distribution of the individual particles is determined from the d.c. demagnetization curve. At a field strength which is equivalent to the remanence coercivity $H_R$, half (by volume) of the particles are reverse-magnetized. Accordingly, the remanence coercivity is a characteristic parameter for recording processes which, in particular, determines the bias setting for magnetic recording. The more non-uniform the remanence coercivity of the individual magnetic particles in the recording layer, the broader is the distribution of the magnetic fields which are able to reverse the magnetization of a defined volume of the recording layer. This is particularly noticeable if, because of high recording densities or short wavelengths, the boundary zone between zones of opposite magnetization is narrow. To characterize the distribution of the field strengths of the individual particles, a value $h_5$ for the total width of the residual induction curve and a value $h_{25}$ for the slope of the residual induction curve are determined from the d.c. demagnetization curve. The values are determined using the equations $$h_5 = \frac{H_{95} - H_5}{H_R} \text{ and}$$
$$h_{25} = \frac{H_{75} - H_{25}}{H_R}$$

The subscript following the letter H indicates what percentage of the particles has in each case been reverse-magnetized. Unmodified gamma-iron(III) oxides have $R_5$ and $R_{25}$ values of about 1.66 and 0.57 respectively.

The cobalt-containing iron oxides produced according to the invention accordingly possess not only a higher coercive force but also slight temperature dependence and low $h_5/h_{25}$ values, as a result of which they are particularly suitable for use in magnetic recording media. These media are produced in a conventional manner. The magnetic materials are dispersed in polymeric binders; suitable binders are compounds known for this purpose, e.g. homopolymers and copolymers of vinyl derivatives, polyurethanes, polyesters and the like. The binders are used as solutions in suitable organic solvents, which may or may not contain other additives. The magnetic coatings are applied to rigid or flexible bases, such as disks, films and cards.

The Examples which follow illustrate the invention.

The magnetic properties of the materials were measured by means of a vibrating sample magnetometer at a field strength of 160 or 800 kA/m. The coercive force $H_c$, measured in kA/m, was determined on the basis of a tap density of $\rho = 1.2$ mg/mm$^3$ ($H_{c\,(\rho=1.2)}$). The specific remanence $M_{r/\rho}$ and the specific saturation magnetization $M_{m/\rho}$ are each quoted in nTm$^3$/g, the latter property also being measured at a field strength of 800 kA/m as $M_{s/\rho}$ in nTm$^3$/g.

EXAMPLE A 1

2 kg of acicular gamma-$Fe_2O_3$ having a coercive force of 23.5 kA/m, a mean particle length of 0.49 μm and a mean particle width of 0.045 μm are dispersed in 30 liters of water and the suspension is brought to pH 7 with dilute sodium hydroxide solution. Working under a blanket of nitrogen, 364 g of $CoCl_2.6H_2O$ are dissolved in 600 ml of water, the solution is added to the suspension and the latter is heated to 35° C. and stirred vigorously for one hour. 1,695 ml of 48% strength sodium hydroxide solution are then added in the course of two minutes, after which 232 g of Fe(II) in the form of an $FeCl_2$ solution are added, with continued stirring. The suspension is then stirred for a further six hours under a nitrogen blanket, and is filtered, and the filter cake is washed neutral and heated for 2 hours at 130° C. under nitrogen.

The magnetic properties ascertained, the titrimetrically determined magnetite content, the specific surface area $S_{N2}$ determined by the BET method, and the pH of the material are shown in Table 1.

TABLE 1

| Example | Co content | $Fe_3O_4$ content | pH | $S_{N2}$ $m^2/g$ | $M_{m/\rho}$ | $M_{r/\rho}$ | $H_c$ ($\rho = 1.2$) |
| --- | --- | --- | --- | --- | --- | --- | --- |
| A 1 | 3% | 13.9 | 7.2 | 16.4 | 79 | 42 | 38.6 |

EXAMPLE B 1

6 kg of acicular gamma-$Fe_2O_3$ having a coercive force of 24.0 kA/m, a mean particle length of 0.48 μm and a mean particle width of 0.045 μm are dispersed in 30 liters of water. 728 g of $CoCl_2.6H_2O$, dissolved in one liter of water, are added to the suspension at room temperature and the mixture is stirred for one hour under a nitrogen blanket. 3,390 ml of 48% strength sodium hydroxide solution are then added in the course of 8 minutes. Thereafter 464 g of Fe(II) in the form of a technical-grade $FeCl_2$ solution are introduced dropwise in the course of one hour. The suspension is stirred for 6 hours at room temperature under a nitrogen blanket and is then filtered, and the filter residue is washed neutral with water.

The filter cake is divided into three parts. Part B1/I is heated for two hours at 150° C. under nitrogen. Part B1/II is first heated for two and a half hours at 110° C. in a stream of air and then for one hour at 150° C. under nitrogen. Part B1/III is heated for two hours at 150° C. in a stream of air. The results of the measurements are shown in Table 2.

COMPARATIVE EXAMPLE B 2

6 kg of acicular gamma-$Fe_2O_3$ having a coercive force of 24.0 kA/m, a mean particle length of 0.49 μm and a mean particle width of 0.049 μm are dispersed in 30 liters of water. 728 g of $CoCl_2.6H_2O$, dissolved in one liter of water, are added to the suspension at room temperature and the mixture is then stirred for one hour under a nitrogen blanket. Thereafter the suspension is heated to 80° C. and 3,390 ml of 48% strength sodium hydroxide solution are added. 464 g of Fe(II) in the form of a technical-grade $FeCl_2$ solution are then introduced dropwise in the course of one hour. The suspension is stirred for a further 6 hours at 80° C., and when it has cooled the product is filtered off and washed neutral with water. The filter cake is divided into three parts and these, referred to as samples B2/I, B2/II and B2/III, are subjected to the same heat treatment as that described for B1/I to B1/III. The results of the measurements are shown in Table 2.

TABLE 2

| | Heat treatment | Co modification | $Fe_3O_4$ % | $M_{m/\rho}$ | $M_{r/\rho}$ | $H_c$ ($\rho = 1.2$) |
| --- | --- | --- | --- | --- | --- | --- |
| Experiment | | | | | | |
| B 1/I | 150° C./$N_2$ for 2 hours | 3% | 15 | 81 | 44 | 44.7 |
| B 1/II | 110° C./air for 2½ hours + 150° C./$N_2$ for 1 hour | 3% | 9.3 | 75 | 40 | 39.9 |
| B 1/III | 150° C./air for 2 hours | 3% | 7 | 82 | 43 | 36.2 |
| Comparative experiment | | | | | | |
| B 2/I | 150° C./$N_2$ for 2 hours | 3% | 17.3 | 83 | 45 | 35.2 |
| B 2/II | 110° C./air for 2½ hours + 150° C./$N_2$ for 1 hour | 3% | 14.5 | 81 | 43 | 33.5 |
| B 2/III | 150° C./air for 2 hours | 3% | 8.5 | 75 | 39 | 31.2 |

EXAMPLE C 1

500 g of acicular gamma-$Fe_2O_3$ having a coercive force of 23.8 kA/m, a mean particle length of 0.50 μm and a mean particle width of 0.048 μm are dispersed in 2.5 liters of water. 60 g of $CoCl_2.6H_2O$ are added and the mixture is stirred thoroughly for one hour at room temperature, under a nitrogen blanket. 282 ml of 48% strength sodium hydroxide solution are then added in the course of 10 minutes, after which a solution containing 38 g of Fe(II) ions is introduced dropwise in the course of 35 minutes. The batch is then stirred for a further 6 hours at room temperature under a nitrogen blanket.

The suspension is filtered and the filter cake is washed neutral with water and then heated for two hours at 150° C. in a stream of nitrogen. The results of the measurements are shown in Table 3.

COMPARATIVE EXAMPLE C 2

The procedure of Experiment C 1 is followed, except that a nitrogen blanket is not used and the process is carried out in an open vessel, in air.

TABLE 3

| | Heat treatment | Co modification | $Fe_3O_4$ % | $M_{m/\rho}$ | $M_{r/\rho}$ | $H_c$ ($\rho = 1.2$) |
| --- | --- | --- | --- | --- | --- | --- |
| Experiment | | | | | | |
| C 1 | 150° C./$N_2$ for 2 hours | 3% | 22 | 83 | 44 | 39.4 |
| Comparative | | | | | | |

TABLE 3-continued

|  | Heat treatment | Co modification | $Fe_3O_4$ % | $M_{m/\rho}$ | $M_{r/\rho}$ | $H_c$ ($\rho = 1.2$) |
| --- | --- | --- | --- | --- | --- | --- |
| experiment |  |  |  |  |  |  |
| C 2 | 150° C./$N_2$ for 2 hours | 3% | 6 | 76 | 37 | 28.6 |

EXAMPLE D 1

500 g of gamma-$Fe_2O_3$ having a coercive force of 24.0 kA/m, a mean particle length of 0.49 μm and a mean particle width of 0.047 μm are dispersed in 2.5 liters of water. 60 g of $CoCl_2.6H_2O$, dissolved in a small amount of water, are added to the suspension and the mixture is stirred for 30 minutes at room temperature under a nitrogen blanket. 282 ml of 48% strength NaOH solution are then added, followed by the drop-wise introduction of 77.5 g of Fe(II), in the form of a technical-grade $FeCl_2$ solution, in the course of 50 minutes, with vigorous stirring. Stirring is then continued for 6 hours at room temperature under a nitrogen blanket, after which the suspension is filtered and the filter cake is washed neutral with water and divided into four portions:

Part D 1/I is heated for two hours at 130° C. in a stream of nitrogen, part D 1/II for two hours at 150° C. in a stream of nitrogen, part D 1/III for 2½ hours at 110° C. in a stream of air and then for one hour at 150° C. under nitrogen, and part D 1/IV for two hours at 130° C. in a stream of air. The results of the measurements are shown in Table 4.

COMPARATIVE EXAMPLE D 2

250 g of gamma-$Fe_2O_3$ having a coercive force $H_c$ of 24.0 kA/m, a mean particle length of 0.46 μm and a mean particle width of 0.046 μm are dispersed in 1.25 liters of water. 30 g of $CoCl_2.6H_2O$, dissolved in a small amount of water, are added to the suspension. The entire reaction is carried out under a nitrogen blanket, at room temperature. 113 ml of 48% strength NaOH solution are then made up to 1 liter with water, and 500 ml of this dilute NaOH solution was added to the suspension. 1.2 moles of $NaBH_4$ are dissolved in the remaining 500 ml of the dilute NaOH solution, and the $NaBH_4$ solution is added dropwise to the suspension, with energetic stirring. A vigorous evolution of gas occurs, which has subsided after about 7 hours. Stirring is then continued for one hour after which the suspension is filtered. The filter cake is washed neutral with water and divided into two portions, which are then treated, as samples D 2/I and D 2/II, in the same way as samples D 2/I and D 1/II. The results of the measurements are shown in Table 4.

TABLE 4

|  | Heat treatment | Co modification | $Fe_3O_4$ % | $M_{m/\rho}$ | $M_{r/\rho}$ | $H_c$ ($\rho = 1.2$) |
| --- | --- | --- | --- | --- | --- | --- |
| Experiment |  |  |  |  |  |  |
| D 1/I | 130° C./$N_2$ for 2 hours | 3% | 35.0 | 85 | 45 | 44.9 |
| D 1/II | 150° C./$N_2$ for 2 hours | 3% | 32.0 | 85 | 46 | 46.8 |
| D 1/III | 110° C./air for 2½ hours + 150° C./$N_2$ for 1 hour | 3% | 22.0 | 83 | 43 | 43.4 |
| D 1/IV | 130° C./air for 2 hours | 3% | 15.0 | 85 | 45 | 37.1 |
| Comparative experiment |  |  |  |  |  |  |
| D 2/I | 130° C./$N_2$ for 2 hours | 3% | 33.3 | 88 | 43 | 30.8 |
| D 2/II | 150° C./$N_2$ for 2 hours | 3% | 31.0 | 86 | 44 | 34.0 |

EXAMPLE E 1

500 g of gamma-$Fe_2O_3$ having a coercive force $H_c$ of 23.5 kA/m, a mean particle length of 0.49 μm and a mean particle width of 0.048 μm are dispersed in 2.5 liters of water. 100 g of $CoCl_2.6H_2O$, dissolved in a small amount of water, are added to the suspension and the mixture is stirred thoroughly for one hour at room temperature, under a nitrogen blanket. 475 ml of 48% strength sodium hydroxide solution are then added in the course of 10 minutes and finally a solution containing 70 g of Fe(II), in the form of a technical-grade $FeCl_2$ solution, are added dropwise in the course of 35 minutes. Stirring is continued at room temperature for 6 hours under a nitrogen blanket, after which the suspension is filtered. The filter cake is washed neutral with water and divided into three parts. Part E 1/I is heated for two hours at 130° C. in a stream of nitrogen, part E 1/II for seven hours at 150° C. in a stream of nitrogen and part E 1/III for two hours at 130° C. in a stream of air. The results of the measurements are shown in Table 5.

EXAMPLE E 2

The procedure followed is as described in Example E 1, except that only 40 g of $CoCl_2.6H_2O$ are added to the suspension. The results of the measurements are also shown in Table 5.

TABLE 5

| Experiment | Heat treatment | Co modification | $Fe_3O_4$ % | $M_{m/\rho}$ | $M_{r/\rho}$ | $H_c$ ($\rho = 1.2$) |
| --- | --- | --- | --- | --- | --- | --- |
| E 1/I | 130° C./$N_2$ for 2 hours | 5% | 27.3 | 82 | 48 | 50.1 |
| E 1/II | 150° C./$N_2$ for 7 hours | 5% | 25.0 | 80 | 46 | 58.4 |
| E 1/III | 130° C./air for 2 hours | 5% | 13.5 | 82 | 49 | 47.3 |
| E 2/I | 130° C./$N_2$ for 2 hours | 2% | 27.6 | 86 | 45 | 36.8 |
| E 2/II | 150° C./$N_2$ for 7 hours | 2% | 27.5 | 83 | 46 | 44.3 |
| E 2/III | 130° C./air for 2 hours | 2% | 16.6 | 86 | 44 | 31.7 |

EXAMPLE F 500 g of acicular gamma-$Fe_2O_3$ having a coercive force $H_c$ of 26.2 kA/m, a mean particle length of 0.55 μm and a mean particle width of 0.039 μm are dispersed in 2.5 liters of water. 20 g of $CoCl_2.6H_2O$, dissolved in a small amount of water, are added to the dispersion and the mixture is stirred for one hour at room temperature, under a nitrogen blanket. 282 ml of 48% strength sodium hydroxide solution are added and 35 g of Fe(II), in the form of a technical-grade $FeCl_2$ solution, are introduced dropwise into the suspension in the course of 30 minutes. The suspension is then stirred for 6 hours at room temperature under a nitrogen blanket and the solid is filtered off and washed neutral with water. The filter cake is heated for two hours at 130° C. in a stream of air. The results of the measurements are shown in Table 6.

EXAMPLE G 6 kg of acicular gamma-$Fe_2O_3$ having a coercive force $H_c$ of 27.3 kA/m, a mean particle length of 0.56 μm and a mean particle width of 0.050 μm are dispersed in 30 liters of water. 366 g of $CoCl_2.6H_2O$, dissolved in 1 liter of water, are added to the suspension and the mixture is stirred thoroughly for one hour. The entire reaction takes place at room temperature, under a nitrogen blanket. 3,390 ml of 48% strength sodium hydroxide solution are then added to the suspension in the course of 10 minutes, after which 462 g of Fe(II) ions, in the form of a technical-grade $FeCl_2$ solution, are introduced drop-wise. The suspension is then stirred for a further 6 hours and filtered, and the filter cake is washed neutral with water and heated for 2 hours in a stream of air at 150° C. The results of the measurements are shown in Table 6.

EXAMPLE H 3.5 kg of acicular gamma-$Fe_2O_3$ having a coercive force of 26.2 kA/m, a mean particle length of 0.55 μm and a mean particle width of 0.039 μm are dispersed in 17.5 liters of water. The entire subsequent reaction takes place at room temperature under an inert gas atmosphere. 706.5 g of $CoCl_2.6H_2O$, dissolved in 1 liter of water, are added to the suspension and the mixture is stirred thoroughly for 1 hour. 2,000 ml of 48% strength sodium hydroxide solution are then added rapidly, after which a solution containing 490 g of Fe(II), in the form of a technical-grade $FeCl_2$ solution, is introduced dropwise in the course of one hour. The suspension is then stirred for 6 hours and is filtered. The filter cake is washed neutral with water and heated for two hours at 180° C. in a stream of nitrogen. The results of the measurements are shown in Table 6.

EXAMPLE I/1

900 parts of a material prepared as described in Example B 1/I, 225 parts of a 20% strength solution of a copolymer of 80% of vinyl chloride, 10% of dimethyl maleate and 10% of diethyl maleate in a mixture of equal parts of tetrahydrofuran and dioxane, 808 parts of a 13% strength solution of a thermoplastic polyester-urethane obtained from adipic acid, 1,4-butanediol and 4,4'-diisocyanatodiphenylmethane, in a mixture of equal parts of tetrahydrofuran and dioxane, 54 parts of soybean lecithin, 0.9 parts of a commercial silicone oil, 1.8 parts of hydroquinone, 1.8 parts of butyl stearate, 9 parts of isostearic acid and 620 parts of the stated solvent mixture are mixed, and dispersed, in a steel ball mill. The dispersion is then mixed with 1.5% of 4,4'-diisocyanatodiphenylmethane, filtered and applied in a conventional manner to a 6 μm thick polyethylene terephthalate film in such a thickness that, after orienting the acicular particles in a magnetic field and then effecting drying, a magnetic coating having the thickness d [μm] shown in Table 7 is obtained.

The magnetic properties of the pigment, such as the coercive force $H_c$ [kA/m], residual induction $M_r$ [mT], saturation magnetization [mT], relative remanence $M_r/M_s$ and $h_{25}$ value, are measured at a field strength of 800 kA/m and are shown in Table 7, as are the electroacoustic properties, such as the maximum output level at short wavelengths $A_H$ and the sensitivity at short wavelengths $E_H$, measured, substantially in accordance with DIN 45,512, on a magnetic tape cut from the coated film, in comparison with the relevant reference tapes, at a recording frequency of 10 kHz.

EXAMPLE I/2

The procedure followed is as in Example I/1, except that the magnetic material employed is that prepared as described in Example F. The results of the measurements are shown in Table 7.

EXAMPLE I/3

The procedure followed is as in Example I/1, except that the magnetic material employed is that prepared as described in Example G. The results of the measurements are shown in Table 7.

EXAMPLE I/4

The procedure followed is as in Example I/1, except that the magnetic material employed is that prepared as described in Example H. The results of the measurements are shown in Table 7.

EXAMPLE I/5

The procedure followed is as in Example I/1, except that the magnetic material employed is the starting material used in Example A1. The results of the measurements are shown in Table 7.

TABLE 6

| Experiment | Heat treatment | Co modification | $Fe_3O_4$ % | $M_{m/\rho}$ | $M_{r/\rho}$ | $H_{c(\rho = 1.2)}$ |
|---|---|---|---|---|---|---|
| Example F | 130° C./air for 2 hours | 1.0% | 29.5 | 82 | 40 | 33.0 |
| Example G | 150° C./air for 2 hours | 1.5% | 4.5 | 82 | 43 | 32.6 |
| Example H | 180° C./$N_2$ for 2 hours | 5.0% | 27.3 | 80 | 47 | 62.6 |

TABLE 7

| Example | $H_c$ | $M_r$ | $M_s$ | $M_r/M_s$ | $h_{25}$ | d | Reference tape according to DIN | $A_H$ | $E_H$ |
|---|---|---|---|---|---|---|---|---|---|
| I/1 | 50,9 | 153 | 302 | 0.76 | 0.29 | 4.8 | C 401 R | + 2.9 | + 2.0 |
| I/2 | 33.9 | 156 | 190 | 0.82 | 0.32 | 4.8 | T 308 S | + 2.6 | + 2.0 |
| I/3 | 32.5 | 137 | 165 | 0.83 | 0.31 | 5.0 | T 308 S | + 3.2 | + 2.6 |
| I/4 | 68.7 | 147 | 182 | 0.81 | 0.31 | 4.8 | C 401 R | + 6.0 | + 4.0 |
| I/5 | 21.7 | 166 | 198 | 0.84 | 0.29 | 4.3 | T 308 S | − 1.1 | + 0.3 |

We claim:

1. A process for the manufacture of acicular, magnetic iron oxide consisting of a core of gamma-iron(III) oxide surrounded by a ferrite shell which contains, based on the amount of magnetic material, from 0.2 to 12 percent by weight of cobalt(II) ions and from 0.1 to 15 percent by weight of iron(II) ions, which process comprises: suspending acicular gamma-iron(III) oxide in water, adding to said suspension an aqueous solution containing cobalt(II) ions, followed by the addition of an aqueous base to bring the pH to not less than 10, both additions being made at room temperature, thereafter introducing an aqueous solution containing iron(II) ions under an inert gas atmosphere, with continued stirring, and after the cobalt(II) hydroxide and iron(II) hydroxide has precipitated under the inert gas atmosphere, the solid product is filtered off, washed neutral with water and heated at from 100° to 200° C. for from one to seven hours, the steps of stirring, precipitating and filtering all taking place at room temperature.

* * * * *